United States Patent [19]
Wanger et al.

[11] Patent Number: 5,726,971
[45] Date of Patent: *Mar. 10, 1998

[54] DATA STORAGE CARTRIDGE ASSEMBLY

[75] Inventors: Mark Elliot Wanger, Fort Collins; Robert Dale Proctor, Loveland; Thomas Charles Oliver, Fort Collins, all of Colo.

[73] Assignee: Hewlett-Packard Company, Palo Alto, Calif.

[*] Notice: The portion of the term of this patent subsequent to Jan. 4, 2011, has been disclaimed.

[21] Appl. No.: 38,430

[22] Filed: Mar. 29, 1993

Related U.S. Application Data

[63] Continuation of Ser. No. 629,305, Dec. 18, 1990, Pat. No. 5,276,675.

[51] Int. Cl.$^6$ .................................................. G11B 23/03
[52] U.S. Cl. ................................................ 369/291; 360/133
[58] Field of Search ............................... 369/36, 38, 37, 369/39, 291, 292; 360/133, 92

[56] References Cited

U.S. PATENT DOCUMENTS

| | | | |
|---|---|---|---|
| 4,849,844 | 7/1989 | Kato | 360/133 |
| 4,903,252 | 2/1990 | Tanaka et al. | 369/36 |
| 4,918,548 | 4/1990 | O'Donnell et al. | 360/92 |
| 4,958,249 | 9/1990 | Kadokura et al. | 360/133 |

OTHER PUBLICATIONS

Brochure entitled "Lubricomp Internally Lubricated Reinforced Thermoplastics and Fluoropolymer Composites"; Bulletin #254.688; from LNP; Santa Ana, California, prior to Dec. 1990.

*Primary Examiner*—Jefferson Evans

[57] ABSTRACT

An optical disk cartridge assembly comprising: an optical disk for storing data thereon in machine readable form; a casing for rotatably supporting the optical disk therewithin and for shielding the optical disk from physical contact with other objects; and a door slideably mounted on the casing for selectively covering and uncovering an opening therein; the casing having a wear factor associated with sliding contact with the door of less than $100\times10^{-10}$ in.$^3$-min./ft.-lb.-hr. and most preferably less than $10\times10^{-10}$ in.$^3$-min./ft.-lb.-hr. An information storage system employing a low-wear optical disk cartridge assembly and a method of making a low-wear optical disk cartridge assembly are also disclosed.

19 Claims, 3 Drawing Sheets

DATA STORAGE CARTRIDGE ASSEMBLY

This is a continuation of application Ser. No. 07/629,305 filed on Dec. 18, 1990, now U.S. Pat. No. 5,276,675.

BACKGROUND OF THE INVENTION

The present invention relates generally to an optical disk cartridge assembly and, more particularly to an optical disk cartridge assembly provided with a low wear casing.

An optical disk is a data storage medium which is readable by a laser-based reading device. Optical disks known as "compact disks" or "CDs" have become increasing popular during the past few years for recording music and audio-video works. Due to the huge storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be "erased" and "written" with new information, i.e. ROM disks are "read only" memory devices. However, recent technology has produced optical disks which are both computer readable and computer writable. Thus, in the future, optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are generally provided in a cartridge assembly including an optical disk, a parallelepiped-shaped casing in which the disk is rotatably mounted, and a sliding reader door which selectively covers or uncovers an opening in the casing to shield or expose the disk. An optical disk reading/writing device or "optical drive" generally receives a cartridge assembly through a narrow slot provided on the front face of the device. Typically, the cartridge being inserted initially abuttingly engages a biased door in the device and is urged against the door to open it. The cartridge casing then slides over a supporting surface within the reading/writing device as it is pushed into the device. After the cartridge has been loaded into the device, a locating pin within the device is inserted through a transversely extending hole on the cartridge casing to hold the cartridge in a fixed position within the device. Prior to reading/writing, a mechanism within the device slides open the cartridge door to expose the disk to a laser.

Currently, most optical disks are hand-inserted into drives. However, for large databases consisting of many optical disks, it is preferable, and perhaps essential, to provide an optical disk storage system for storing the disks at known locations, and an optical disk handling system which is capable of retrieving a desired disk from a storage location and inserting the disk into an optical disk drive.

U.S. patent application Ser. No. 314,012 filed Feb. 22, 1989, of Wanger et al. for CARTRIDGE HANDLING SYSTEM, now U.S. Pat. No. 5,010,536, is hereby specifically incorporated by reference for all that it discloses. This patent discloses a disk storage and retrieval system or "autochanger" wherein the stored disks and an associated disk reader are arranged in a longitudinally extending, two-dimensional array consisting of vertically extending columns and laterally extending rows. This autochanger system is adapted to engage a disk, move it vertically, laterally, and/or longitudinally and then release it in order to remove it from storage, move it into aligned relationship with the disk reader, and insert it into the disk reader. The disk handling system is also adapted to flip the disk to reverse the side thereof which will be positioned in readable relationship with a reader. The system is further adapted to reorient a disk at the time it is initially inserted into the system by an operator.

Cartridge casings are subject to wear as a result of surface contact made with other objects. Wear rate is generally defined as the volumetric loss of material over a unit time. A "wear factor" may be defined in terms of parameters which affect wear rate. "Wear factor", as used herein, is defined as follows:

K (wear factor)=W/FVT, where:

W=volume wear (in$^3$)

F=force (lb)

V=velocity (ft/min)

T=elapsed time (hr)

The wear factors for various materials as specified herein are based upon wear factor measurements made in accordance with a procedure described at p. 25 of a brochure entitled: *LUBRICOMP INTERNALLY LUBRICATED REINFORCED THERMOPLASTICS AND FLUOROPOLYMER COMPOSITES Bulletin* 254.688, which is available from LNP (a business unit of ICI Americas, Inc.), 1831 E. Carnegie, Santa Ana, Calif., 92705, which is hereby specifically incorporated by reference for all that it discloses.

Currently, most optical disk casings are constructed from a thermoplastic material such as polycarbonate which has a wear factor "K" on the order of $2500 \times 10^{-10}$ in$^3$-min/ft-lb-hr. It is applicants' discovery that such currently used casing material creates a problem in optical disk cartridge assemblies which are used in autochangers such as described in U.S. patent application Ser. No. 314,012 and such as are currently sold under the product designation C1710 by Hewlett-Packard Company having a business address of 3000 Hanover Street, Palo Alto, Calif., 94304. Applicants have discovered that in such autochangers abrasive wear of cartridge casings causes a build up of fine particles in the autochanger optical drives which contaminates the surface of optical disks, thus effecting the reading or writing operation being performed, and which also may cause jamming of the cartridge door and jamming of other malfunctions of the optical drives or various other mechanical assemblies of the autochanger. Applicants have discovered that this particle build up is produced by frictional engagement of the cartridge with various surfaces of cartridge storage cells, the optical drive(s), and the cartridge handling mechanism of the autochanger, as well as by the sliding movement of the reader doors of cartridges. These problems associated with abrasive wear of cartridges used in autochangers were to applicants' knowledge not know in the art prior to applicants' discovery.

SUMMARY OF THE INVENTION

The present invention is directed to solving the problem of autochanger malfunction. It is applicants' discovery that one cause of autochanger malfunction is the build up of particulate matter within autochanger drives and other system components and that the cause of this particulate matter build up is abrasive contact between the surfaces of currently used optical disk cartridge casings and the reader doors of the cartridges and also the abrasive contact between the cartridge casings and the various surfaces of the autochanger system with which the cartridges make contact.

Applicants have solved this problem by providing a cartridge casing which has a wear factor which is sufficiently low so as to avoid particulate build up of a magnitude which would significantly adversely effect the operation of an autochanger.

Thus, the invention may comprise an optical disk cartridge assembly comprising an optical disk for storing data thereon in machine readable form; a casing for rotatably supporting the optical disk therewithin and for shielding the optical disk from physical contact with other objects; and a door slideably mounted on the casing for selectively covering and uncovering an opening therein; the casing having a wear factor associated with sliding contact with the door of less than $100 \times 10^{-10}$ in.$^3$-min./ft.-lb.-hr. and most preferably less than $10 \times 10^{-10}$ in.$^3$-min./ft.-lb.-hr.

The invention may also comprise an information storage assembly. The information storage assembly includes an optical disk cartridge assembly comprising an optical disk for storing data thereon in machine readable form; a casing for rotatably supporting the optical disk therewithin and for shielding the optical disk from physical contact with other objects; and a door slideably mounted on the casing for selectively covering and uncovering an opening therein. The information storage assembly also includes an optical disk reading device for slideably receiving the optical disk cartridge assembly therein and for reading data from the optical disk; a cartridge storage cell for storing the optical disk cartridge assembly during periods when the cartridge assembly is not inserted in the optical disk reading device; and a mechanized cartridge handling device for engaging the cartridge assembly and for moving the cartridge assembly between the cartridge storage cell and the optical disk reading device. The casing has a wear factor associated with sliding contact with the door and with sliding contact with any engaged surface of the optical disk reading device, the cartridge storage cell, and the mechanized cartridge handling device of less than $350 \times 10^{-10}$ in.$^3$-min./ft.-lb.-hr. and most preferably less than $100 \times 10^{-10}$ in.$^3$-min./ft.-lb.-hr.

The casing may be constructed from a thermoplastic material impregnated with at least one of: polytetrafluoroethylene (PTFE), silicone, glass fiber and carbon fiber. The thermoplastic material may comprise at least one of: ABS plastic, SAN plastic, and polycarbonate plastic. In one preferred embodiment the casing is constructed from a thermoplastic material impregnated with carbon fiber wherein the carbon fiber is at least 30% by weight. In another preferred embodiment the casing is constructed from a thermoplastic material impregnated with PTFE wherein the PTFE is at least 15% by weight.

The invention may also comprise a method of producing an optical disk cartridge assembly including the steps of constructing a casing door; constructing a cartridge casing from a material having a wear factor, associated with sliding contact with the casing door, of less than $100 \times 10^{-10}$ in.$^3$-min./ft.-lb.-hr.; and rotatably mounting an optical disk within the cartridge casing.

BRIEF DESCRIPTION OF THE DRAWINGS

Illustrative and presently preferred embodiments of the invention are shown in the accompanying drawings in which.

DETAILED DESCRIPTION OF THE PREFERRED EMBODIMENTS OF THE INVENTION

Autochanger Assembly

Figure 1:
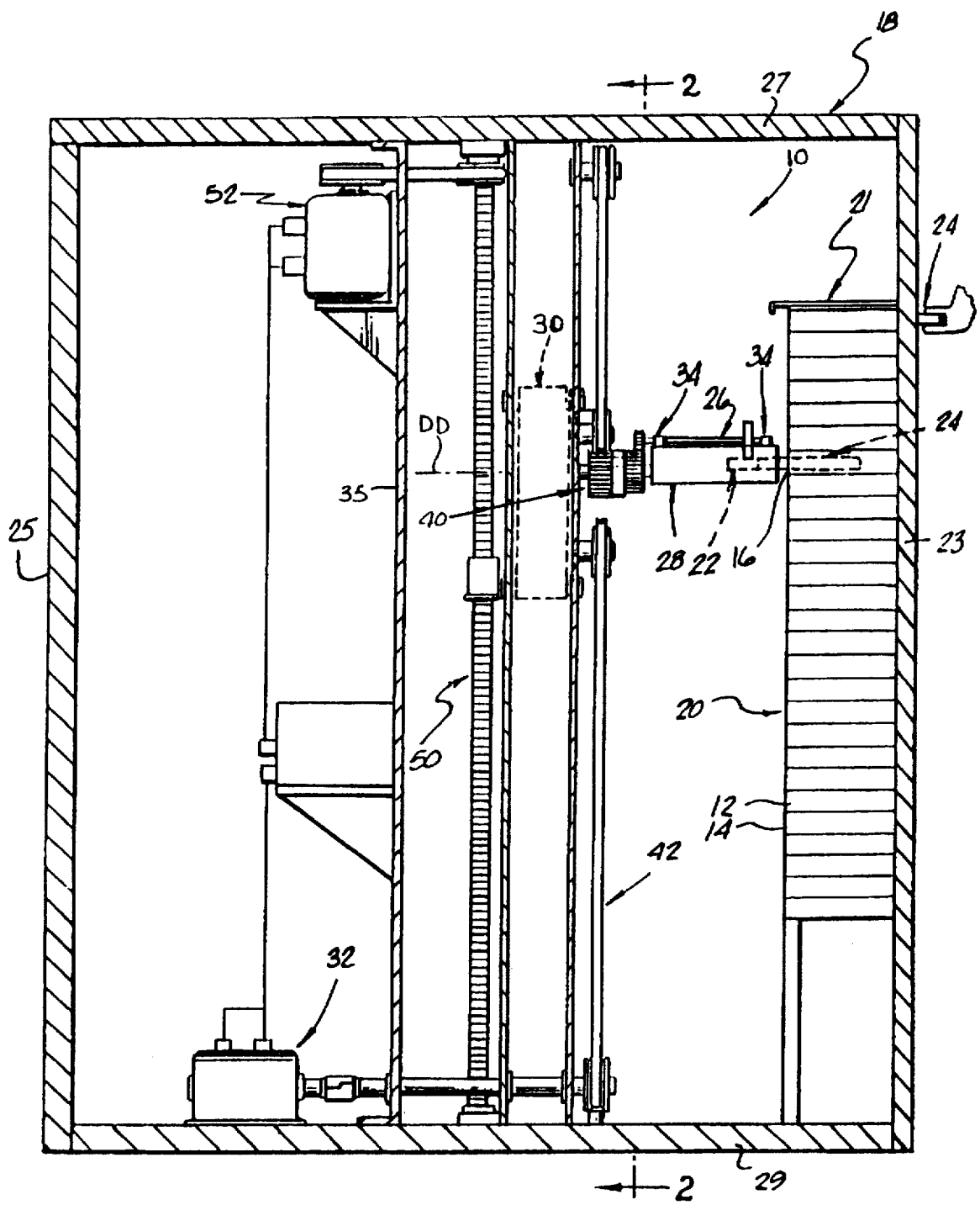
FIG. 1 is a schematic side elevation view of an optical disk cartridge handling system.
Figure 2:
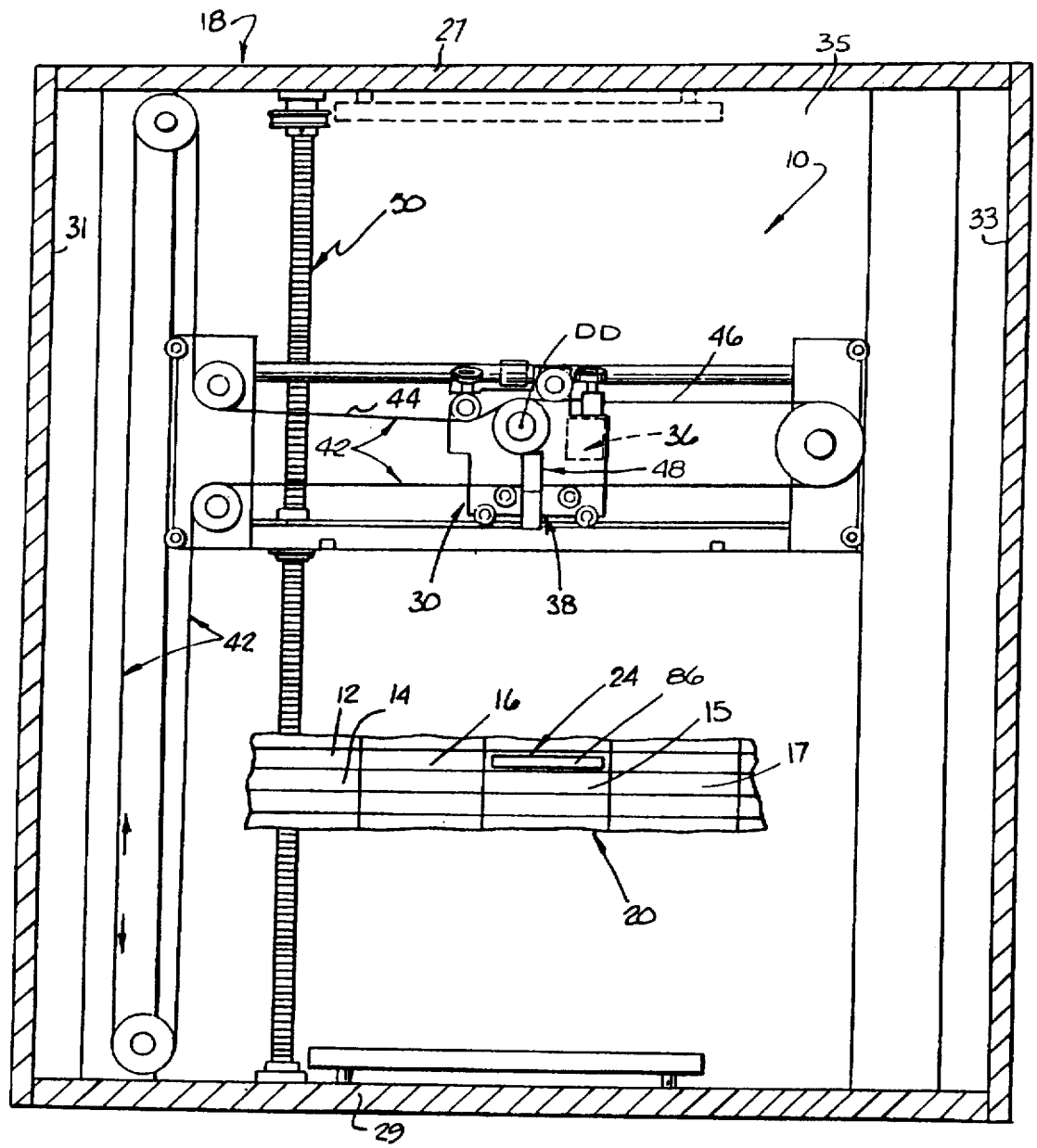
FIG. 2 is a schematic front elevation view of an optical disk cartridge handling system.

FIGS. 1 and 2 illustrate an optical disk cartridge handling system 10 for use in association with a plurality of longitudinally extending, rearwardly opening, cartridge holding units which include storage cells 12, 14, 16, etc. and disk reading/writing devices or optical drives 15, 17 arranged in a laterally and vertically extending holding unit array 20. The handling system 10 and holding unit array 20, sometimes referred to herein collectively as an "autochanger assembly" or simply "autochanger", is provided within a closed housing 18 having a front wall 23, a back wall 25, a top wall 27, a bottom wall 29, a left lateral side wall 31, and a right lateral side wall 33. An intermediate housing wall 35 may be positioned between the front and back walls for separating electronic and motor components from other components of the apparatus.

The handling system 10 may comprise an insertion means 21 for receiving a cartridge 24 which is hand-inserted by a human operator with a first end of the cartridge positioned forwardly. The insertion means longitudinally and rotationally displaces the cartridge so as to present the cartridge to a cartridge engaging means with the first end of the cartridge positioned towards the rear of the housing.

A cartridge engaging means 22 is provided for engaging an exposed end portion of a cartridge positioned in the insertion means 21 or in another aligned holding unit, e.g. 12, 14, 16.

A longitudinal displacement means 26 is operatively associated with the engaging means for longitudinally displacing a cartridge 24 engaged by the engaging means 22.

A flipping means 28 is operatively associated with the engaging means 22 and is used for invertingly rotating a cartridge engaged by the engaging means about a longitudinally extending flip axis DD.

A lateral displacement means 30 is operatively associated with the engaging means 22 for laterally displacing a cartridge 24 engaged by the engaging means.

A rotatable first drive means 32 is drivingly linked to the longitudinal displacement means 26, the flipping means 28, and the lateral displacement means 30 for providing driving force thereto.

Stop means 34 may be provided which limit the movement of the longitudinal displacement means 26.

A flip latch means 36 is provided which has a latched state and an unlatched state and which is operatively associated with the flipping means 28 for preventing rotation thereof when the flip latch means 36 is in the latched state.

A translation latch means 38 is provided which has a latched state and an unlatched state. The translation latch means is operatively associated with the lateral displacement means 30 for preventing lateral displacement thereof when the translation latch means is in the latched state.

The cartridge handling system 10 has a longitudinally displacing operating state wherein the stop means 34 is in disengaged relationship with the longitudinal displacement means 26; the flip latch means 36 is in its latched state; and the translation latch means 38 is in its latched state. The cartridge handling system 10 comprises a rotatably flipping operating state wherein the stop means 34 is in engaged relationship with the longitudinal displacement means 26; the flip latch means 36 is in its unlatched state; and the translation latch means 38 is in its latched state. The cartridge handling system 10 also comprises a laterally displacing operating state wherein the translation latch means 38 is in its unlatched state.

A first gear means 40 (22, 36, 4170, 4172) is provided which is mounted in rotationally displaceable relationship with the lateral displacement means 30 and which is drivingly linked to the longitudinal displacement means 26 and the flipping means 28.

A continuous drive belt means 42 is provided which is continuously nonslippingly engaged with the first gear means 40 for drivingly linking the first gear means 40 with the first drive means 32. The continuous belt means may comprise a first portion 44 extending in a first lateral direction from the first gear means 40 and a second portion 46 extending in a second lateral direction from the first gear means. The lateral displacement means 30 is laterally displaceable through movement of the continuous belt means 42 when the first gear means 40 is locked against rotation.

A gear lock means 48 having a locked state and an unlocked state is provided which is operatively associated with the first gear means 40. The gear lock means 48 prevents rotation of the first gear means 40 when the gear lock means is in its locked state. The cartridge handling system 10 is constructed and arranged such that the gear lock means 48 is in its locked state when the translation latch means 38 is in its unlatched state, and such that the gear lock means 48 is in its unlocked state when the translation latch means 38 is in its latched state.

The optical disk cartridge handling system 10 also comprises a vertical displacement means 50 for vertically displacing a cartridge 24 engaged by the cartridge engaging means 22. A second drive means 52 is operatively associated with the vertical displacement means 50 for providing driving force thereto.

Optical Disk Cartridge Assembly

Figures 3, 4:
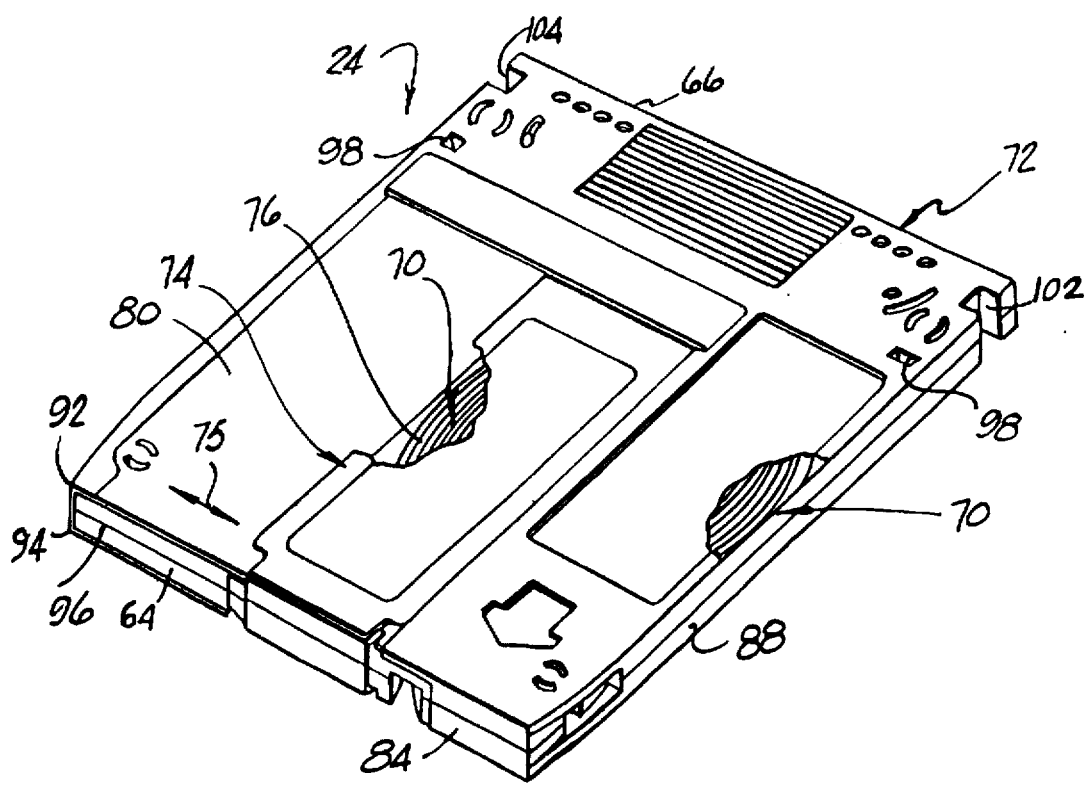
FIG. 3 is a perspective view of an optical disk cartridge assembly.
FIG. 4 is a schematic, cut away, side elevation view of a portion of an optical disk reading apparatus and optical disk cartridge assembly.

An optical disk cartridge assembly 24 is shown in FIG. 3. Cartridge assembly 24 has a rear end portion 64 which is adapted to be inserted into an optical disk reading device, e.g. 15, and has a forward end portion 66 which is adapted to ordinarily be grasped by a human operator for inserting and removing the cartridge from an optical disk reading device.

The cartridge assembly includes an optical disk 70, a casing 72 within which the optical disk is rotatably mounted, and a reader door 74 which is slideably mounted on the casing 72. The reader door is slidingly displaceable, as indicated at 75 to cover or uncover an opening 76 in the casing so as to enable a reading or writing laser beam within an optical drive to impinge upon the optical disk. The reader door is biased in the closed position and is openingly displaceable by a mechanism (not shown) within an optical drive. The reader door may be constructed from steel or other material and may be fabricated and mounted on the casing by conventional techniques known in the art.

The cartridge casing 72 is generally parallelepiped shaped having generally flat top 80, bottom 82, rear 84, front 86, and lateral 88, 90 exterior surfaces. The casing may be constructed from a separate top section 92 and bottom section 94 which may be individually injection molded using conventional molding techniques well known in the art. The top and bottom sections meet at seam line 96 and are held together as by screws (not shown) or other conventional means well known in the art. The top and bottom sections 92, 94 define an enclosure within which the optical disk 70 is conventionally rotatably mounted.

One or more holes 98 are provided which extend transversely through the casing and which are adapted to receive a pin portion 118 of the optical drive for registering the cartridge with the drive as described in further detail below. The casing is also provided with vertically extending channels 102, 104 in its lateral sidewalls near the front end 66 thereof for enabling the cartridge to be engaged and moved by the cartridge handling system 10.

FIG. 4 schematically illustrates portions of an optical disk drive 15 (which may be a Sony Model SMO-D501-01 Optical Disk Drive which is commercially available from Hewlett-Packard Company having a business address of 3000 Hanover Street, Palo Alto, Calif., 94304. The drive 15 comprises a spring biased, normally vertically disposed, hinged door 110 which is adapted to be urged into the open position illustrated in phantom in FIG. 4 by the rear end 84 of a cartridge casing during insertion of the cartridge in the drive 15. The drive door 110 is typically constructed from polycarbonate. One or more horizontal support rails 112 are provided within the drive for slideably engaging and supporting the cartridge casing at the bottom surface 82 thereof. The support rails 112 are typically constructed from steel. At least one vertically extendable registration pin assembly 116 is provided within the drive which is adapted to extend a registration pin 118 from a raised position, as shown in solid lines, to a lowered position as shown in phantom. The pin 118 is extended after the cartridge is inserted into the optical drive and passes through hole 98 in the cartridge casing so as to hold the cartridge in a fixed registration position with the optical drive. The pin 118 sometimes makes contact with the casing surface defining hole 98 as it is inserted.

During initial insertion of an optical disk cartridge assembly into the disk handling apparatus 10, the cartridge casing makes contact at the rear and bottom surface portions thereof with portions of the insertion apparatus 21 which may comprises parts made primarily from polyethersulfone (PES). The cartridge 24 is subsequently removed from the insertion apparatus by engagement of the cartridge by fingers of engagement means 22 at its vertical channel portions 102, 103 and is sliding moved across a horizontal surface of longitudinal displacement means 26. Both the fingers of engagement means 22 and the horizontal surface of displacement means 26 may be constructed from nylon. The cartridge 26 is next slidingly inserted into a drive, e.g. 15, or a storage cell, e.g. 14. The storage cells may have cartridge support surfaces constructed from polycarbonate.

The material from which the cartridge casing is constructed has a wear factor of preferably less than $350 \times 10^{-10}$ $in^3$-min/ft-lb-hr, and most preferably less than $100 \times 10^{-10}$ $in^3$-min/ft-lb-hr, with respect to each surface in the autochanger with which the cartridge makes frictional contact. The material from which the cartridge casing is constructed has a wear factor of preferably less than $100 \times 10^{-10}$ $in^3$-min/ft-lb-hr and most preferably less than $10 \times 10^{-10}$ $in^3$-min/ft-lb-hr with respect to the reader door.

In one preferred embodiment of the invention the cartridge casing is constructed from thermoplastic material which has been impregnated with a lubricating filler including at least one of: polytetrafluoroethylene (PTFE), silicone. The cartridge casing may also be constructed from thermoplastic material which has been impregnated with a reinforced filler which also lower friction such as carbon fiber. The thermoplastic material from which the cartridge casing is constructed is preferably one of: ABS plastic, SAN plastic, and polycarbonate plastic.

The cartridge casing is most preferably constructed from a thermoplastic material impregnated with carbon fiber in which the amount of carbon fiber by weight is at least 30% of the total weight of the casing material or impregnated with PTFE in which the amount of PTFE by weight is at least 15% of the total weight of the casing material. The casing materials described in this paragraph are commercially available from a number of sources, including LNP Engineering Plastics, 1831 E. Carnegie, Santa Ana, Calif., 92705.

By using casing materials as specifically described above, the resulting optical disk cartridge may typically be loaded into an autochanger optical disk drive in excess of 100,000 times before a drive jamming failure caused by casing wear is encountered. Optical disk cartridges using conventional casing material typically cause drive jamming due to casing wear after less than 5,000 drive loads.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A data storage cartridge assembly comprising:
   a data storage medium for storing data thereon in machine readable form;
   a casing for supporting said data storage medium therewithin and for shielding said data storage medium from physical contact with other objects; and
   a door slideably mounted on said casing for selectively covering and uncovering an opening therein;
   said casing having a wear factor associated with sliding contact with said door of less than $100 \times 10^{-10}$ in$^3$-min/ft-lb-hr; and
   said casing being constructed from a thermoplastic material impregnated with a lubricating filler wherein said lubricating filler comprises at least 15% by weight of said casing.

2. The invention of claim 1 said casing having a wear factor associated with sliding contact with said door of less than $10 \times 10^{-10}$ in$^3$-min/ft-lb-hr.

3. The invention of claim 1 said thermoplastic material comprising at least one of: ABS plastic, SAN plastic and polycarbonate plastic.

4. The invention of claim 1 said lubricating filler comprising at least one of: polytetrafluoroethylene (PTFE), and silicone.

5. The invention of claim 1 said casing material being at least 15% by weight PTFE.

6. An information storage assembly comprising:
   a) a data storage cartridge assembly comprising:
      i) a data storage medium for storing data thereon in machine readable form; and
      ii) a casing for supporting said data storage medium therewithin and for shielding said data storage medium from physical contact with other objects;
   b) a data storage medium reader for slideably receiving said data storage cartridge assembly therein and for reading data from said data storage medium;
   c) a cartridge storage cell for storing said data storage cartridge assembly during periods when said cartridge assembly is not inserted in said reader;
   d) mechanized cartridge handling assembly for engaging said cartridge assembly and for moving said cartridge assembly between said cartridge storage cell and said reader;
   said casing having a wear factor associated with sliding contact with any engaged surface of said reader, said cartridge storage cell, and said mechanized cartridge handling assembly of less than $350 \times 10^{-10}$ in$^3$-min/ft-lb-hr;
   said casing being constructed from a thermoplastic material impregnated with a lubricating filler wherein said lubricating filler comprises at least 15% by weight of said casing.

7. The invention of claim 6 said casing having a wear factor associated with sliding contact with any engaged surface of said reader, said cartridge storage cell, and said mechanized cartridge handling assembly of less than $100 \times 10^{-10}$ in$^3$-min/ft-lb-hr.

8. The invention of claim 6 said thermoplastic material comprising at least one of: ABS plastic, SAN plastic, and polycarbonate plastic.

9. The invention of claim 6, said lubricating filler comprising at least one of: polytetrafluoroethylene (PTFE), and silicone.

10. The invention of claim 6 said casing being at least 15% by weight PTFE.

11. A method of producing a data storage cartridge assembly comprising the steps of:
   a) constructing a casing door;
   b) constructing a cartridge casing from a thermoplastic material impregnated with a lubricating filler which is at least 15% by weight of the casing, said casing having a wear factor, associated with sliding contact with said casing door, of less than $100 \times 10^{-10}$ in$^3$-min/ft-lb-hr;
   c) mounting a data storage medium within said cartridge casing.

12. The invention of claim 11 wherein said step of constructing a cartridge casing comprises using a casing material having a wear factor associated with sliding contact with said casing door, of less than $10 \times 10^{-10}$ in$^3$-min/ft-lb-hr.

13. The invention of claim 11 wherein said step of constructing a cartridge casing comprises using a casing material which is at least 15% by weight PTFE.

14. A data storage cartridge assembly comprising:
   a data storage medium for storing data thereon in machine readable form;
   a casing for supporting said data storage medium therewithin and for shielding said data storage medium from physical contact with other objects; and
   a door slideably mounted on said casing for selecting covering and uncovering an opening therein;
   said casing having a wear factor associated with sliding contact with said door of less than $100 \times 10^{-10}$ in$^3$-min/ft-lb-hr; and
   said casing being constructed from a thermoplastic material impregnated with a reinforcing filler which reduces friction comprising at least 30% by weight of said casing.

15. The invention of claim 14, said casing being at least 30% by weight carbon fiber.

16. An information storage assembly comprising:
   a) a data storage cartridge assembly comprising:
      i) a data storage medium for storing data thereon in machine readable form; and
      ii) a casing for supporting said data storage medium therewithin and for shielding said data storage medium from physical contact with other objects;

b) a data storage medium reader for slideably receiving said cartridge assembly therein and for reading data from said data storage medium;

c) a cartridge storage cell for storing said cartridge assembly during periods when said cartridge assembly is not inserted in said reader;

d) a mechanized cartridge handling assembly for engaging a cartridge assembly and for moving said cartridge assembly between said cartridge storage cell and said reader;

said casing having a wear factor associated with sliding contact with any engaged surface of said reader, said cartridge storage cell, and said mechanized cartridge handling assembly of less than $350 \times 10^{-10}$ in$^3$-min/ft-lb-hr;

said casing being constructed from a thermoplastic material impregnated with a reinforcing filler which reduces friction, said reinforcing filler which reduces friction comprising at least 30% by weight of said casing.

17. The invention of claim 16, said casing being at least 30% by weight carbon fiber.

18. A method of producing a data storage cartridge assembly comprising the steps of:

a) constructing a casing door;

b) constructing a cartridge casing from a thermoplastic material impregnated with a reinforcing filler which reduces friction, said reinforcing filler which reduces friction comprising at least 30% by weight of said casing, said casing having a wear factor, associated with sliding contact with said casing door, of less than $100 \times 10^{-10}$ in$^3$-min/ft-lb-hr; and c) mounting a data storage medium within said cartridge casing.

19. The invention of claim 18, wherein said step of constructing a cartridge casing comprises using a casing material which is at least 30% by weight carbon fiber.

* * * * *